(12) United States Patent
Gupta et al.

(10) Patent No.: US 11,858,517 B2
(45) Date of Patent: Jan. 2, 2024

(54) DYNAMIC GROUPS AND ATTRIBUTE-BASED ACCESS CONTROL FOR NEXT-GENERATION SMART CARS

(71) Applicant: The Board of Regents of the University of Texas System, Austin, TX (US)

(72) Inventors: Maanak Gupta, Cookeville, TN (US); James Benson, San Antonio, TX (US); Farhan Patwa, San Antonio, TX (US); Ravinderpal Sandhu, Helotes, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 420 days.

(21) Appl. No.: 16/811,165

(22) Filed: Mar. 6, 2020

(65) Prior Publication Data

US 2020/0283002 A1 Sep. 10, 2020

Related U.S. Application Data

(60) Provisional application No. 62/814,948, filed on Mar. 7, 2019.

(51) Int. Cl.
*B60W 40/08* (2012.01)
*H04W 4/46* (2018.01)
(Continued)

(52) U.S. Cl.
CPC .......... *B60W 40/08* (2013.01); *G05D 1/0297* (2013.01); *H04W 4/44* (2018.02); *H04W 4/46* (2018.02)

(58) Field of Classification Search
CPC .......... B60W 40/08; H04W 4/46; H04W 4/44; G05D 1/0297
(Continued)

(56) References Cited

U.S. PATENT DOCUMENTS 8,015,404 B2 * 9/2011 Alrabady ........... G06Q 20/3674
713/168
10,580,306 B1 * 3/2020 Harris ..................... H04W 4/40
(Continued)

OTHER PUBLICATIONS

S. Mohan, A. Biswas, A. Tripathy, J. Pannigrahy and R. Mahapatra, "A parallel architecture for meaning comparison," 2010 IEEE International Symposium on Parallel & Distributed Processing (IPDPS), Atlanta, GA, USA, 2010, pp. 1-10, doi: 10.1109/IPDPS.2010.5470371. (Year: 2010).*

*Primary Examiner* — Isaac G Smith
(74) *Attorney, Agent, or Firm* — Smith, Gambrell & Russell, LLP

(57) ABSTRACT

Embodiments of the present systems and methods may provide techniques that provide dynamic groups and attribute-based access control (ABAC) model (referred as CV-$ABAC_G$) to secure communication, data exchange and resource access in smart vehicles ecosystems. In embodiments, the model not only considers system wide attributes-based security policies, but also takes into account individual user privacy preferences for allowing or denying service notifications, alerts, and operations to on-board resources. Embodiments of the present systems and methods may provide groups in vehicular IoT, which may be dynamically assigned to moving entities like connected cars, based on their current GPS coordinates, speed or other attributes, to ensure relevance of location and time sensitive notification services, to provide administrative benefits to manage large numbers of entities, and to enable attributes inheritance for fine-grained authorization policies.

23 Claims, 14 Drawing Sheets

(51) Int. Cl.
*H04W 4/44* (2018.01)
*G05D 1/02* (2020.01)

(58) Field of Classification Search
USPC .......................................................... 701/23
See application file for complete search history.

(56) References Cited

U.S. PATENT DOCUMENTS

| | | | | |
|---|---|---|---|---|
| 2004/0068364 | A1* | 4/2004 | Zhao | G08G 1/096844 |
| | | | | 455/414.2 |
| 2015/0095156 | A1* | 4/2015 | Sauerbrey | H04W 4/48 |
| | | | | 705/14.58 |
| 2017/0032672 | A1* | 2/2017 | Bijlani | G08G 1/096741 |
| 2018/0018463 | A1* | 1/2018 | Grossman | A63F 13/75 |
| 2020/0064140 | A1* | 2/2020 | Tarkiainen | G08G 1/22 |
| 2020/0294401 | A1* | 9/2020 | Kerecsen | G05D 1/0287 |

* cited by examiner

```
('Received new coordinates from:', 'Vehicle-1')
Sun May 27 02:56:30 2018
   Location A
      Car-A : [u'Vehicle-1', u'Vehicle-2']
      Bus-A : []
   Location B
      Car-B : []
      Bus-B : [u'Vehicle-6']
   Location C
      Car-C : [u'Vehicle-3', u'Vehicle-4']
      Bus-C : []
   Location D
      Car-D : []
      Bus-D : [u'Vehicle-5']
```

```
{
  "Deer_Threat": {           ←——— Policy Operation
    "Source": {
      "1": {                 ←----- Source Attributes
        "Location": {
          "Location-A": {"Group": ["Location-A"]},
          "Location-B": {"Group": ["Location-B"]}
        }
      },
    }
  },
  "car_pool_notification": { ←——— Policy Operation
    "Source": {
      "Location-A": {        ←--- Source Attributes
        "destination": {
          "Location-A": {"Notification": ["Car-A"]},
          "Location-B": {"Notification": ["Car-A", "Car-B", "Car-C"]},
          "Location-C": {"Notification": ["Car-C", "Car-D"]},
          "Location-D": {"Notification": ["Car-A", "Car-C", "Car-D"]}
        }
      },
    }
  }
}
```

Object Attributes

800

↖ 1000

| Number of Requests | Policy Enforcer Execution Time (in ms) | nth Request | Cars Notified With ABAC Policy | Cars Notified Without Policy |
|---|---|---|---|---|
| 10 | 0.0501 | 41st | 2 | 5 |
| 20 | 0.1011 | 42nd | 3 | 5 |
| 30 | 0.1264 | 43rd | 5 | 5 |
| 40 | 0.1630 | 44th | 3 | 5 |
| 50 | 0.1999 | 45th | 2 | 5 |
|  |  | 46th | 3 | 5 |

Table 1: Formal CV-ABAC$_G$ Model Definitions for Connected Vehicles Ecosystem

Basic Sets and Functions
- S, CO, O, G, OP are finite sets of sources, clustered objects, objects, groups and operations respectively [blue circles in Figure 4].
- A is a finite set of activities which can be performed in system.
- ATT is a finite set of attributes associated with S, CO, O, G and system-wide.
- For each attribute att in ATT, Range(att) is a finite set of atomic values.
- attType: ATT = {set, atomic}, defines attributes to be set or atomic valued.
- Each attribute att in ATT maps entities in S, CO, O, G to attribute values. Formally, $$\text{att}: S \cup CO \cup O \cup G \cup \{\text{system-wide}\} \to \begin{cases} \text{Range(att)} \cup \{\bot\} & \text{if attType(att) = atomic} \\ 2^{\text{Range(att)}} & \text{if attType(att) = set} \end{cases}$$

- POL is a finite set of authorization policies associated with individual S, CO, O, G.
- directG : CO $\to$ G, mapping each clustered object to a system group, equivalently CGA $\subseteq$ CO $\times$ G.
- parentCO : O $\to$ CO, mapping each object to a clustered object, equivalently OCA $\subseteq$ O $\times$ CO.
- GH $\subseteq$ G $\times$ G, a partial order relation $\succeq_g$ on G. Equivalently, parentG : G $\to$ $2^G$, mapping group to a set of parent groups in hierarchy.

Effective Attributes of Groups, Clustered Objects and Objects (Derived Functions)
- For each attribute att in ATT such that attType(att) = set:
  - effG$_{att}$ : G $\to$ $2^{\text{Range(att)}}$, defined as effG$_{att}$(g$_i$) = att(g$_i$) $\cup$ ( $\bigcup_{g \in \{g_j | g_i \succeq_g g_j\}}$ effG$_{att}$(g)).
  - effCO$_{att}$ : CO $\to$ $2^{\text{Range(att)}}$, defined as effCO$_{att}$(co) = att(co) $\cup$ effG$_{att}$(directG(co)).
  - effO$_{att}$ : O $\to$ $2^{\text{Range(att)}}$, defined as effO$_{att}$(o) = att(o) $\cup$ effCO$_{att}$(parentCO(o)).
- For each attribute att in ATT such that attType(att) = atomic:
  - effG$_{att}$ : G $\to$ Range(att) $\cup$ {$\bot$}, defined as effG$_{att}$(g$_i$) = $\begin{cases} \text{att}(g_i) & \text{if } \forall g' \in \text{parentG}(g_i). \text{ effG}_{att}(g') = \bot \\ \text{effG}_{att}(g') & \text{if } \exists \text{ parentG}(g_i). \text{ effG}_{att}(\text{parentG}(g_i)) \neq \bot \text{ then select} \\ & \text{parent } g' \text{ with effG}_{att}(g') \neq \bot \text{ updated most recently.} \end{cases}$
  - effCO$_{att}$ : CO $\to$ Range(att) $\cup$ {$\bot$}, defined as effCO$_{att}$(co) = $\begin{cases} \text{att(co)} & \text{if effG}_{att}(\text{directG(co)}) = \bot \\ \text{effG}_{att}(\text{directG(co)}) & \text{otherwise} \end{cases}$
  - effO$_{att}$ : O $\to$ Range(att) $\cup$ {$\bot$}, defined as effO$_{att}$(o) = $\begin{cases} \text{att(o)} & \text{if effCO}_{att}(\text{parentCO(o)}) = \bot \\ \text{effCO}_{att}(\text{parentCO(o)}) & \text{otherwise} \end{cases}$

Authorization Functions (Policies)
- Authorization Function: For each op $\in$ OP, Auth$_{op}$(s : S, ob : CO $\cup$ O $\cup$ G) is a propositional logic formula returning true or false, which is defined using the following policy language:
  - $\alpha ::= \alpha \wedge \alpha \mid \alpha \vee \alpha \mid (\alpha) \mid \neg\alpha \mid \exists x \in \text{set}.\alpha \mid \forall x \in \text{set}.\alpha \mid \text{set} \triangle \text{set} \mid \text{atomic} \in \text{set} \mid \text{atomic} \notin \text{set}$
  - $\triangle ::= \subset \mid \subseteq \mid \nsubseteq \mid \cap \mid \cup$
  - set ::= eff$_{att}$(i) | att(i)   for att $\in$ ATT, i $\in$ S $\cup$ CO $\cup$ O $\cup$ G $\cup$ {system-wide}, attType(att) = set
  - atomic ::= eff$_{att}$(i) | att(i) | value   for att $\in$ ATT, i $\in$ S $\cup$ CO $\cup$ O $\cup$ G $\cup$ {system-wide}, attType(att) = atomic

Authorization Decision
- A source s $\in$ S is allowed to perform an activity a $\in$ A, stated as Authorization(a : A, s : S), if the required policies needed to allow the activity are included and evaluated to make final decision. These multi-layer policies must be evaluated for individual operations (op$_i$ $\in$ OP) to be performed by source s $\in$ S on relevant objects (x$_i$ $\in$ CO $\cup$ O $\cup$ G).
  Formally, Authorization(a : A, s : S) $\Rightarrow$ Auth$_{op_1}$(s : S, x$_1$), Auth$_{op_2}$(s : S, x$_2$), ............, Auth$_{op_n}$(s : S, x$_3$)

DYNAMIC GROUPS AND ATTRIBUTE-BASED ACCESS CONTROL FOR NEXT-GENERATION SMART CARS

CROSS-REFERENCE TO RELATED APPLICATIONS

This application claims the benefit of U.S. Provisional Application No. 62/814,948, filed Mar. 7, 2019, the contents of which are hereby incorporated by reference herein in their entirety.

STATEMENT REGARDING FEDERALLY SPONSORED RESEARCH

This invention was made with government support under Grant Numbers 1736209 and 1423481, awarded by the National Science Foundation and Grant Number W911NF1510518, awarded by the Army Research Office. The government has certain rights in the invention.

BACKGROUND

The present invention relates to techniques that provide dynamic groups and attribute-based access control for next-generation smart cars.

Smart cars are among the essential components and major drivers of future cities and connected world. The interaction among connected entities in this vehicular internet of things (IoT) domain, which also involves smart traffic infrastructure, restaurant beacons, emergency vehicles, etc., will offer many real-time service applications and provide safer and more pleasant driving experience to consumers. With more than 100 million lines of code and hundreds of sensors, these connected vehicles (CVs) expose a large attack surface, which can be remotely compromised and exploited by malicious attackers. Security and privacy are big concerns that deter the adoption of smart cars, which if not properly addressed will have grave implications with risk to human life and limb.

Accordingly, a need arises for techniques that provide improved security, flexibility, and finer-granularity in access control for smart vehicle ecosystems.

SUMMARY

Embodiments of the present systems and methods may provide improved security, flexibility, and finer-granularity in access control for smart vehicle ecosystems by providing dynamic groups and attribute-based access control (ABAC) model (referred as CV-ABAC$_G$) to secure communication, data exchange and resource access in smart vehicles ecosystems. In embodiments, the model not only considers system wide attributes-based security policies, but also takes into account individual user privacy preferences for allowing or denying service notifications, alerts, and operations to on-board resources. Embodiments of the present systems and methods may provide groups in vehicular IoT, which may be dynamically assigned to moving entities like connected cars, based on their current GPS coordinates, speed or other attributes, to ensure relevance of location and time sensitive notification services, to provide administrative benefits to manage large numbers of entities, and to enable attributes inheritance for fine-grained authorization policies.

For example, in an embodiment, a computer-implemented method for providing access control to a plurality of vehicles may be implemented in a computer comprising a processor, memory accessible by the processor, and computer program instructions stored in the memory and executable by the processor, the method may comprise generating, at the computer system, stored data representing a plurality of vehicles and a plurality of sensors, at least some of which are associated with the plurality of vehicles, the stored data including a plurality of groups of the plurality of vehicles based on a plurality of criteria, and to including a plurality of groups of the plurality of sensors based on a plurality of criteria, detecting, at the computer system, conditions of the plurality of vehicles, the conditions captured using the sensors, determining, at the computer system, actions to be taken in response to the detected conditions, the actions to be taken for each detected condition determined based on at least one group in which the sensor that detected the condition is included, or based on at least one group in which the vehicle that is associated with the sensor that detected the condition is included, and generating and transmitting, at the computer system, notifications based on the determined actions.

In embodiments, the sensors associated with the plurality of vehicles may be attached to the vehicles or may be integrated with the vehicles. The sensors associated with the plurality of vehicles may detect conditions of the vehicles or operations of the vehicles initiated by occupants of the vehicles. The sensors that are not associated with the plurality of vehicles may detect conditions of locations external to the vehicles. The plurality of criteria on which the plurality of groups of the plurality of vehicles are based may include at least one of a location of a vehicle, a vehicle type, a service to be performed by a vehicle, a service to be performed by an occupant of a vehicle, or a service to be performed or offered to be performed for an occupant of a vehicle.

In an embodiment, a system for providing access control to a plurality of vehicles, may comprise a cloud computing system comprising a plurality of networked computer systems, each networked computer system comprising a processor, memory accessible by the processor, and computer program instructions stored in the memory and executable by the processor, the method comprising generating, at the cloud computing system, stored data representing a plurality of vehicles and a plurality of sensors, at least some of which are associated with the plurality of vehicles, the stored data including a plurality of groups of the plurality of vehicles based on a plurality of criteria, and to including a plurality of groups of the plurality of sensors based on a plurality of criteria, detecting, at the cloud computing system, conditions of the plurality of vehicles, the conditions captured using the sensors, determining, at the cloud computing system, actions to be taken in response to the detected conditions, the actions to be taken for each detected condition determined based on at least one group in which the sensor that detected the condition is included, or based on at least one group in which the vehicle that is associated with the sensor that detected the condition is included, and generating and transmitting, at the cloud computing system, notifications based on the determined actions.

In an embodiment, a computer program product for providing access control to a plurality of vehicles may comprise a non-transitory computer readable storage having program instructions embodied therewith, the program instructions executable by at least one computer system in a cloud computing system comprising a plurality of networked computer systems, each networked computer system comprising a processor, memory accessible by the processor, and the computer program instructions stored in the memory and executable by the processor, the method comprising generating, at the cloud computing system, stored data representing a plurality of vehicles and a plurality of sensors, at least some of which are associated with the plurality of vehicles, the stored data including a plurality of groups of the plurality of vehicles based on a plurality of criteria, and to including a plurality of groups of the plurality of sensors based on a plurality of criteria, detecting, at the cloud computing system, conditions of the plurality of vehicles, the conditions captured using the sensors, determining, at the cloud computing system, actions to be taken in response to the detected conditions, the actions to be taken for each detected condition determined based on at least one group in which the sensor that detected the condition is included, or based on at least one group in which the vehicle that is associated with the sensor that detected the condition is included, and generating and transmitting, at the cloud computing system, notifications based on the determined actions.

BRIEF DESCRIPTION OF THE DRAWINGS

The details of the present invention, both as to its structure and operation, can best be understood by referring to the accompanying drawings, in which like reference numbers and designations refer to like elements.

FIG. 7 is an exemplary block diagram of Dynamic Groups and Vehicles in AWS according to embodiments of the present systems and methods.

FIG. 8 is an exemplary block diagram of Attribute Based Policies in AWS according to embodiments of the present systems and methods.

FIG. 13 is an exemplary table of Formal CV-ABAC$_G$ Model Definitions for Connected Vehicles Ecosystem according to embodiments of the present systems and methods.

DETAILED DESCRIPTION

Figure 1:
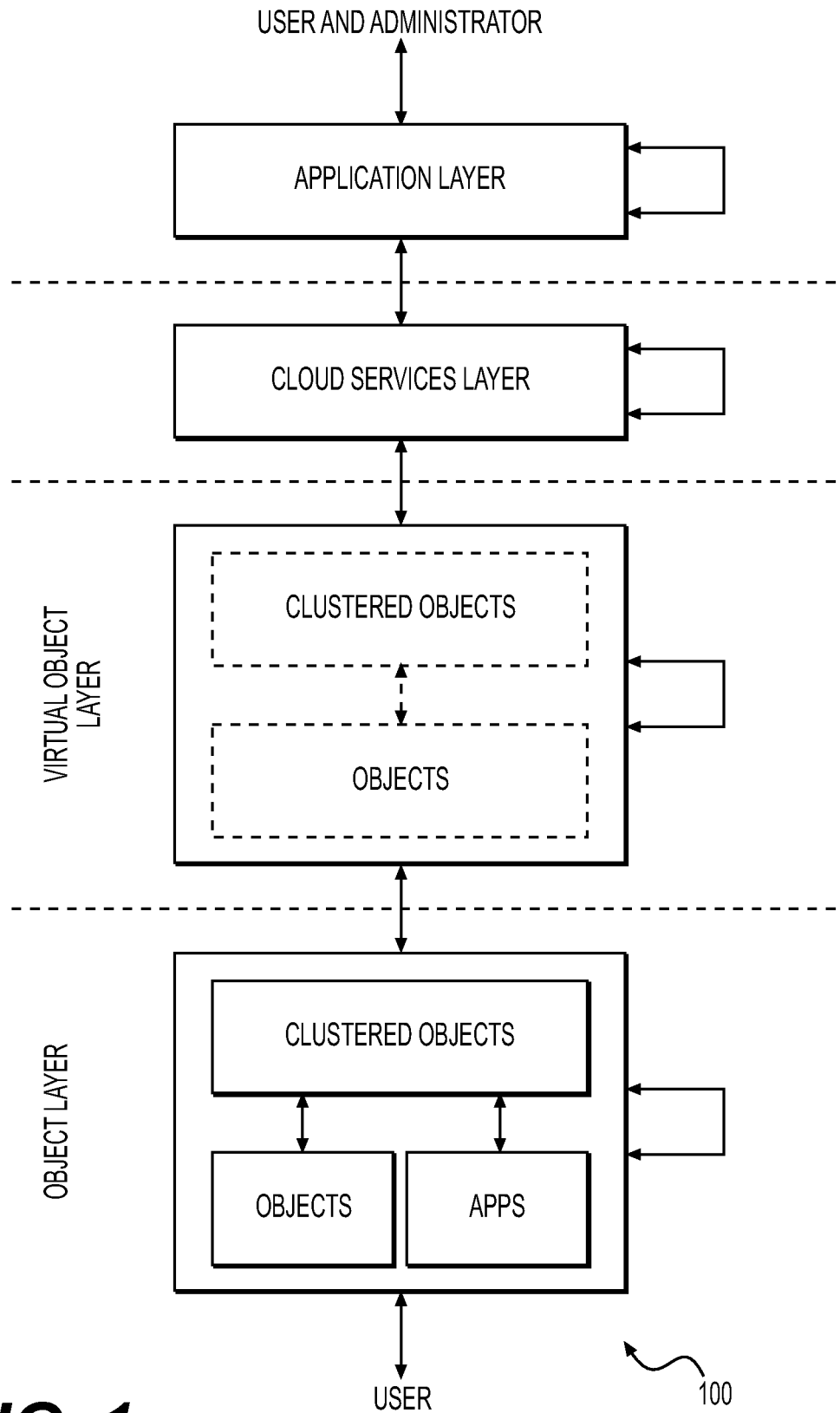
FIG. 1 is an exemplary block diagram of an E-ACO Architecture according to embodiments of the present systems and methods.

Embodiments of the present systems and methods may provide techniques that provide dynamic groups and attribute-based access control (ABAC) model (referred as CV-ABAC$_G$) to secure communication, data exchange and resource access in smart vehicles ecosystem. This model takes into account the user-centric privacy preferences along with system-defined policies to make access decisions. Embodiments of the present systems and methods may provide groups in context of smart cars, which are dynamically assigned to moving entities like vehicles, based on their current GPS coordinates, direction, or other attributes, to ensure relevance of location and time sensitive notification services offered to drivers, provide administrative benefits to manage large numbers of entities and enable attributes inheritance for fine-grained authorization.

Internet of Things (IoT) has become a dominant technology which has proliferated to different application domains including health-care, homes, industry, power-grid, to make lives smarter. It is predicted that the global IoT market will grow to $457 Billion by year 2020, attaining a compound annual growth rate of 28.5%. Automation is leading the world today, and with 'things' around sensing and acting on their own or with a remote user command, has given humans to have anything accessible with a finger touch. Data generated by these smart devices unleash countless business opportunities and offer customer targeted services. IoT along with 'infinite' capabilities of cloud computing are ideally matched with desirable synergy in current technology-oriented world, which has been often termed as cloud-enabled, cloud-centric, or cloud-assisted IoT in literature.

IoT is embraced by every industry with automobile manufacturers and transportation among the most aggressive. Vehicular IoT inherits intrinsic IoT characteristics but dynamic pairing, mobility of vehicles, real-time, location sensitivity are some features which separates it from common IoT applications. The vision of smart city incorporates intelligent transportation where connected vehicles can 'talk' to each other (V2V) and exchange information to ensure driver safety and offer location-based services. These intelligent vehicles can also interact with smart roadside infrastructure (V2I), with pedestrian on road (V2H) or send data to the cloud for processing. Basic safety messages (BSMs) are exchanged among entities using commonly used Wi-Fi like secure and reliable Dedicated Short Range Communication (DSRC) protocol. Vehicles can receive speed limit notification and flash flood alerts on car dashboard or via seat vibration. A car will receive information about nearby parking garages, restaurant offers or remote engine monitoring by authorized mechanic with nearby repair facility and discounts updating automatically. These services will provide pleasant travel experience to drivers and unleash business potential in this intelligent transportation domain. Smart internet connected vehicles embed software having more than 100 million lines of code to control critical systems and functionality, with plethora of sensors and electronic control units (ECUs) on board generating huge amounts of data so these vehicles are often termed as 'datacenter on wheels'.

As vehicles get exposed to external environment and internet, they become vulnerable to cyberattacks. Common security vulnerabilities including buffer overflow, malware, privilege escalation, and trojans etc. can be exploited in connected vehicles. Other potential threats include untrustworthy or fake messages from smart objects, malicious software injection, data privacy, ECU hacking and control, and spoofing connected vehicle sensor. With broad attack surface exposed via air-bag ECU, On-Board Diagnostics (OBD) port, USB, Bluetooth, remote key, and tire-pressure monitoring system etc. these attacks have become much easier to orchestrate. In-vehicle Controller Area Network (CAN) bus also needs security to protect message exchange among ECUs. Further, communication with external networks including cellular, Wi-Fi and insecure public networks of gas stations, toll roads, service garages, or aftermarket dongles are a big threat to connected vehicles security. Cyber incidents including Jeep and Tesla Model X hacks where engine was stopped and steering remotely controlled demonstrate security vulnerabilities. Smart car incidents have serious implications as they can even result in loss of human life.

Access control mechanisms are widely used to restrict unauthorized access to resources and secure communication among entities. Attribute-based access control (ABAC) may provide finer granularity and offers flexibility in distributed multi-entity communication scenarios, which considers characteristics of participating entities along with system and environment properties to determine access decision. Smart cars ecosystem involves dynamic interaction and message exchange among connected objects, which must be authorized. It is necessary that only legitimate entities are allowed to control on-board sensors, data messages and receive notifications. Further, user-centric privacy requires that users can control what alerts they want to receive, what advertisements they are interested or who can access their car's sensors, etc.

Embodiments of the present systems and methods may provide access control in connected smart cars and proposes an attribute-based access control model for connected vehicles ecosystem, referred as CV-ABAC$_G$. Embodiments may utilize the attributes of moving entities, such as current location, speed etc., to dynamically assign them to various groups (for example, predefined by smart city administration), for implementing attributes-based security policies, and also may incorporate user-specific privacy preferences for ensuring relevance of notifications service in constantly changing and mobile smart cars ecosystem. Examples may include a use case of the model as an external authorization engine hooked into the widely used Amazon Web Services (AWS) platform.

Vehicular IoT and smart cars involve dynamic communications and data exchange which requires access controls to restrict within authorized entities.

Extended ACO Architecture. Embodiments of the present systems and methods may provide an extended IoT architecture for specific vehicular IoT and connected vehicles domain. This extended access control architecture (E-ACO), shown in FIG. 1, may include clustered objects (like smart cars and traffic lights) which are objects with multiple individual sensors. Also, these clustered objects may have applications (for example, lane departure or safety warning system in cars) installed on board, which is usually not the case in general IoT realm.

As shown in FIG. 1, four layered E-ACO may have an Object Layer at the bottom that represents physical clustered objects and sensors along with applications installed on them. In-vehicle communication at this layer may be mainly supported by Ethernet and CAN technologies, whereas communication across clustered objects is done using DSRC (used for BSM exchange in V2V communication), Wi-Fi, or LTE etc. It should be noted that each layer in E-ACO architecture interacts within itself and with entities in adjacent layers. Therefore, the object layer may interact with users at the bottom and virtual object layer above it. The Virtual Object Layer acts as an intermediate between cloud services and physical layer, which offers the necessary abstraction by creating cyber entities for physical objects in object layer. In particular in connected vehicles domain, where cars are moving across different terrains where internet connectivity can be an issue, cyber entities may maintain the state of the corresponding physical object as best known and to be updated when connectivity is restored. When two sensors $s_1$ and $s_2$ across different vehicles interact with each other, the order of communication using virtual objects will follow $s_1$ to $vs_1$ (virtual entity of $s_1$), $vs_1$ to $vs_2$ and $vs_2$ to physical sensor $s_2$. Cloud Services and Application Layer: As applications may use cloud services, therefore these two layers are discussed together. On-board sensors may generate data which is stored and processed by cloud services, which is used by applications to offer services to end-users. Cyber-entities of physical objects may be created in a cloud layer that provides a persistent state information of objects. The central cloud may incur latency and bandwidth issues in time-sensitive applications, which can be resolved by introducing an edge or fog computing infrastructure.

Authorization Requirements in Smart Cars. Smart cars may expose the conventionally isolated car systems to the external environment via the Internet. The dynamic and short-lived real time vehicle-to-vehicle (V2V) and vehicle-to-Internet (V2I) interactions with entities in and around a connected vehicle may ensure message confidentiality and integrity, and protection of on-board resources from adversaries.

Multi-Layer and User Privacy Preferences. Broad attack surfaces of connected vehicles may be the first entry point to in-vehicle critical systems. Two-level access control policies may be advantageous to protect the external interface and internal Electronic Control Unit (ECU) communications. Access control for the external environment may protect on-board sensors, applications, and user personal data from unauthorized access by entities including vehicles, applications, masquerading remote mechanics, or other adversaries. Over-the air firmware updates may be checked and may be allowed only from authorized sources. An attacker, even if successful in passing through the first check point, may be restricted at the in-vehicle level, which secures overwrite and control of critical units (engine, brakes, telematics etc.) from adversaries. Vehicles exchange Basic Safety Messages (BSMs), which raises an important question about trust. Information received should be correct and from a trusted party, before being used by on-vehicle applications. Applications may access sensors within and outside the car, which should be authorized. For example, a lane departure warning system accessing tire sensors may be checked to prevent a spoofed application reading vehicle movements. A passenger accessing infotainment (information and entertainment) systems of the car via Bluetooth or using smartphone inside car may also be authorized.

Smart cars location-based services enable notifications and alerts to vehicles. A user must be allowed to set his personal preferences whether he wants to receive advertisements or filter out which ones are acceptable. For instance, a user may not want to receive restaurant notifications but is interested in flash-flood warnings. System wide policy, like a speed warning to all over-speeding vehicles or a policy of who can control speed of autonomous car are needed.

Data protection in the cloud may be advantageous due to frequent occurrence of data breaches. Big Data access control may be use when user privacy is to be ensured and unauthorized disclosure is not allowed. Cross cloud trust models may be needed to allow data access when a mechanic application in a private cloud reads data in the car-manufacturer cloud. Physical tampering of vehicle on-board diagnostics (OBD) and sensors may also require protection.

Figure 2:
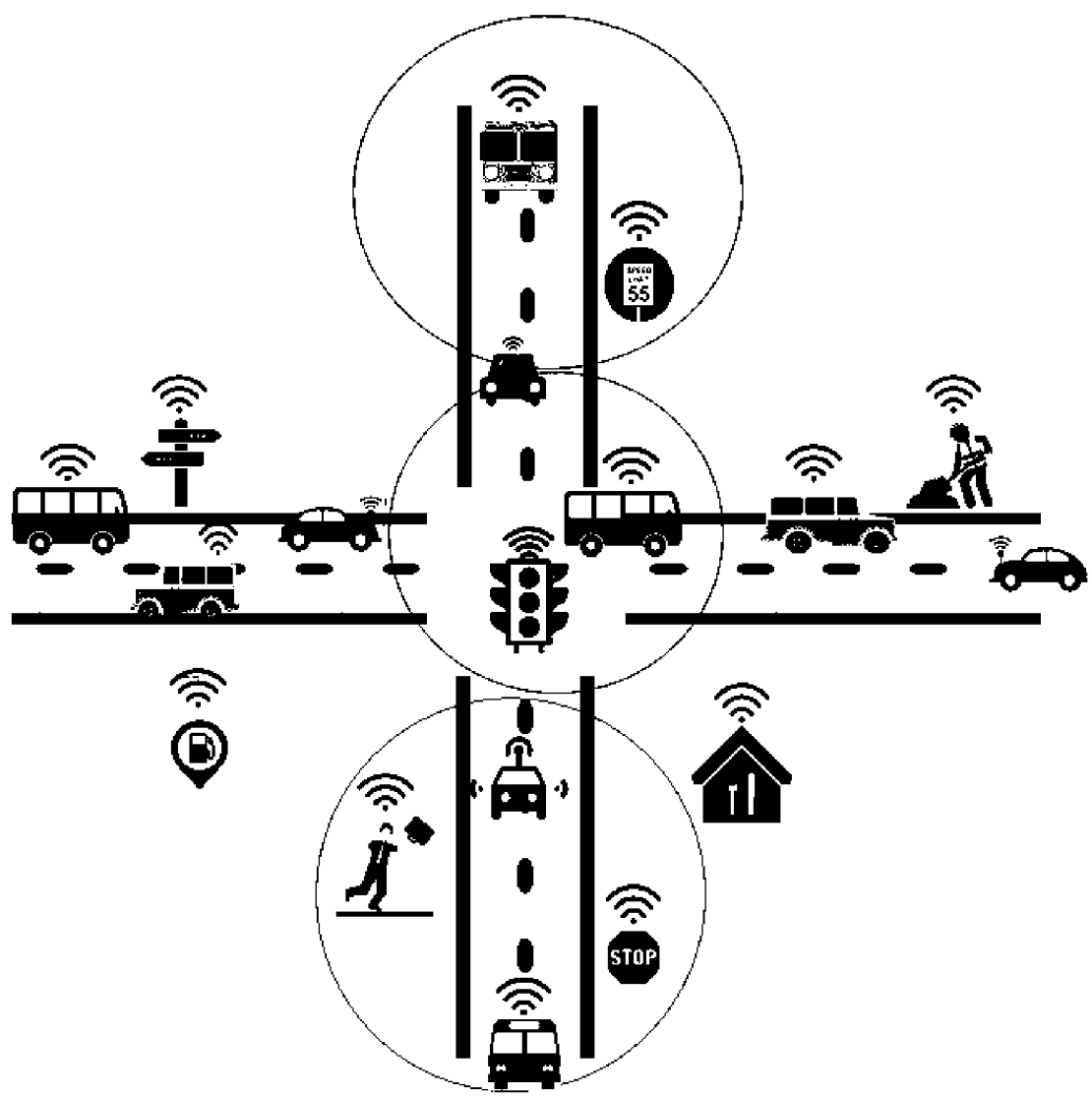
FIG. 2 is an exemplary block diagram of a Smart City with Location Groups according to embodiments of the present systems and methods.

Relevance of Groups. Many smart car applications and service requests from drivers are location specific and time sensitive. For example, a driver may want to get warning signals when traveling near a blind spot, in a school zone, or of pedestrians crossing the road. Further, notifications sent to drivers may be short-lived and mostly pertinent around current GPS coordinates. A gas discount notification from a nearby station, an accident warning two blocks away, or ice on the bridge, are some example where alerts may be sent to all vehicles in the area. Accordingly, dynamically categorizing connected vehicles into location groups may be helpful for scoping the vehicles to be notified instead of a general broadcast and may reduce administrative overheads, since a single notification for the group may trigger alerts for all the members. Also, entities present at a location may have certain characteristics, such as a stop sign warning, speed limit, deer-threat etc., in common, which can be inherited by being a group member. FIG. 2 represents how various smart entities may be separated into different location groups defined by appropriate authorities in a smart city system. These groups may be dynamically assigned to connected vehicles based on their attributes, personal preferences, interests, or current GPS coordinates as further described below.

Figure 3:
FIG. 3 is an exemplary block diagram of Groups Hierarchy according to embodiments of the present systems and methods.

Group hierarchies may also exist, as shown in FIG. 3, with sub-groups within a larger parent group so as to reduce the number of vehicles to be notified. For instance, under a location group, sub-groups may be created for cars, buses, police vehicles, or ambulances, to enable targeted alerts to ambulances or police vehicle sub-groups defined within the location group. Groups may be defined based on services. For example, a group of cars within the car parent group which take part in a car-pooling (CP) service or those that want to receive gas station offers. Group hierarchy also enables attributes inheritance from parent to child groups.

Access Control Model for Connected Vehicles Ecosystem. Dynamic communication and data exchange among entities in connected vehicles ecosystem may utilize multi-layer access control policies, which may be managed centrally and also driven by individual user preferences. Therefore, an access control model may incorporate all such user and system requirements and offer fine-grained authorization solutions.

Figure 4:
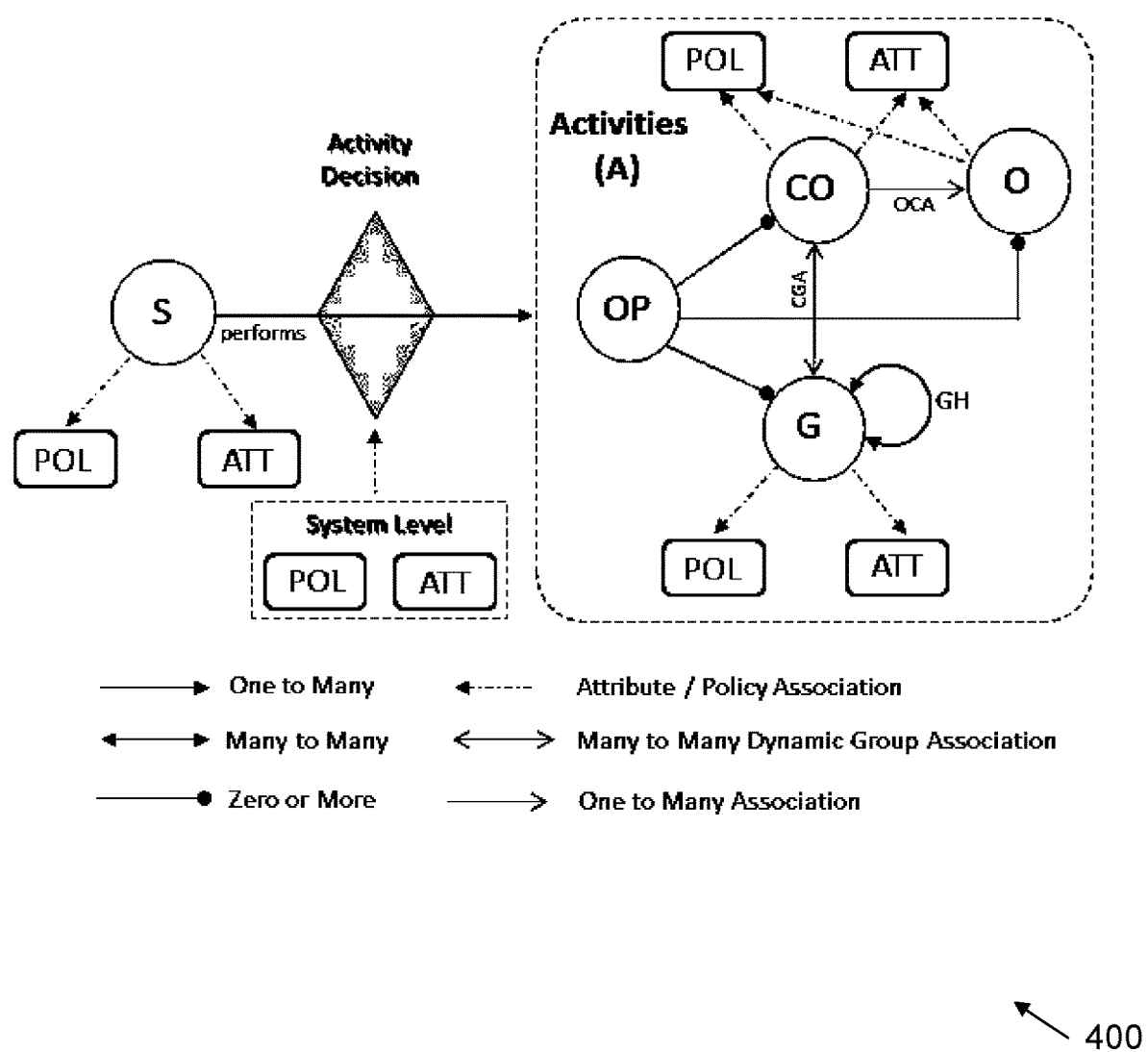
FIG. 4 is an exemplary block diagram of a Conceptual CV-ABAC$_G$ Model according to embodiments of the present systems and methods.

CV-ABAC$_G$ Model Overview. An exemplary embodiment of a conceptual CV-ABAC$_G$ model is shown in FIG. 4 with formal definitions summarized in Table 1, shown in FIG. 13. The basic model may have, for example, the following components: Sources (S), Clustered Objects (CO), Objects in clustered objects (0), Groups (G), Operations (OP), Activities (A), Authorization Policies (POL), and Attributes (ATT).

Sources (S): These entities may initiate activities (described below) on various smart objects, groups, and applications in the ecosystem. A source may be, for example, a user, an application, administrator, sensor, hand-held device, clustered object (such as a connected car), or a group defined in the system. For example, in the case of a flash flood warning, the activity source may be the police or a city department triggering an alert to all vehicles in the area. Similarly, a mechanic may be a source when he tries to access data from on-board sensor in the car using a remote cloud based application. Likewise, a restaurant or gas-station issuing coupons may also be considered sources.

Clustered Objects (CO): Clustered objects may be relevant in the case of connected vehicles, traffic lights or smart devices held by humans, as they may have multiple sensors and actuators. A smart car with on-board sensors, ECUs, such as tire pressure, lane departure, or engine control, and applications, may be a clustered object. These smart entities may interact and exchange data among themselves and with others, such as a requestor source, applications, or the cloud. An important reason to incorporate clustered objects is to reflect cross-vehicle and intra-vehicle communication. The fact that two smart vehicles may exchange basic safety messages (BSM) with each other shows clustered object communication.

Objects in clustered objects (O): These are individual sensors, ECUs, and applications installed in clustered objects. Objects in smart cars may include sensors for the internal state of the vehicle, such as engine diagnostics, emission control, cabin monitoring systems, as well as sensors for external environment, such as cameras, temperature, rain, etc. Control commands may be directly issued to these objects, and data may be read remotely. Applications, such as lane departure warning systems on board may also access data from these objects to provide alerts to a driver or to a remote service provider.

Groups (G): A group is a logical collection of clustered objects with similar characteristics or requirements. With these groups, a subset of COs may be sent relevant notifications and also attributes may be assigned to group members. Some groups that may be defined in a smart vehicle ecosystem may include location specific groups, service specific groups, such as car-pooling, gas station promotions etc., or vehicle type, such as a group of cars, buses etc. Group hierarchy (GH) may enable attributes and policies inheritance from parent to children groups. In embodiments, a vehicle or CO may be a direct member of only one group at the same hierarchy level. For example, a car may be in either location A or B group and but not both. Such restrictions may help in managing attributes inheritance and may enhance the usability of the model.

Operations (OP): Operations may include actions that may be performed against clustered objects, individual objects, or groups. Examples may include: a mechanic performing read, write, or control operations on engine ECU, a restaurant triggering notifications to vehicles in location A group. Operations may also include administrative actions such as creating or updating attributes or policies for COs, objects, and groups, which are usually performed by system/security administrators.

Activities (A): Activities may encompass both operational and administrative activities that are performed by various sources in the system. An activity may have one or many atomic operations (OP) involved and may need authorization policies, which can be user privacy preferences, system defined, or both, to allow or deny an activity. For example, a car pooling notification activity generated by a requestor (source) may be broadcast to all relevant vehicles in the locations nearby using location groups. However individual drivers may also receive or respond to that request based on individual preferences. A driver may not want to car-pool with the requestor because of a poor rating or because he is not going to the destination the requestor asked for. Therefore, an activity may involve multiple sets of policies defined at different levels that must be evaluated. In the case of in car-pooling, a policy may be set to determine cars to be notified and then driver personal preferences. These smart car activities may be divided into categories such as:

Service Requests: These may be activities initiated by entities or users (via applications). For example, a vehicle break-down may initiate a service request to other vehicles around, or a user using a smartphone may initiate a car-pooling request for a destination to cars which are available for the service.

Administration: These activities may perform administrative operations in the system that may include changing policies and attributes of entities or determining the group hierarchy. It may also define the scope of groups, how user privacy preferences are used, or how vehicles are determined to be a member of a group, etc.

Notifications: These may be group centric activities where all members may be notified of any updates about the group, such as speed limit or deer threat notifications in location A, or for location-based marketing promotions by parking lots or restaurants.

Control and Usage: These activities may include simple read, write, or control operations performed remotely or within a vehicle. Over the air updates issued by manufacturers or turning on the car climate control using a smart key may be remote activities, whereas a passenger accessing the infotainment system using a smartphone and on-board car applications reading the car camera are local.

Authorization Policies and Attributes: in embodiments, the CV-ABAC$_G$ model may incorporate individual user privacy controls for different entities by managing authorization policies and entity attributes. As shown in FIG. 4, a policy of sources may include personal preferences, whereas attributes may reflect characteristics such as name, age, or gender. Policies may be defined for clustered objects. For example, a USB device may be plugged-in only by a car owner, or only a mechanic may access an onboard sensor. Attributes of a car may include GPS coordinates, speed, heading direction, vehicle size, etc. Groups may also set policies and attributes for themselves. For example, a car pooling group policy may specify who can be member of the group. Similarly, system wide policies may also be considered. For example, a policy to determine which groups will be sent information when a request comes from a source, or policy to change group hierarchy. Policies may also include attributes of entities involved in an activity. A CO may inherit attributes from dynamically assigned groups, which may change as the CO leaves an old group and joins a new group.

In embodiments, attributes of entities may change more often than system wide or individual policies. Attributes may be more dynamic in nature, and may be added or removed with the movement of vehicles or change in surroundings, such as GPS coordinates or temperature. Policies once set by administrators or users may be more static and only the attributes that comprise the policy may change the outcome of a policy, but the policy definition may remain relatively fixed. For example, a user policy may state 'Send restaurant notifications only from the Cheesecake factory'. In such a case, only the attribute name of the restaurant sending the notification may be checked, and if it is equal to Cheesecake factory, may be able to advertise to that user. Dynamic policies may also be possible, for example, a policy may state that police vans in locations groups A and B may be notified in case of emergency, but, in case of a bigger threat this policy may be changed or overwritten with police vans in groups A, B C and D. The model may also assume that no policies or attributes are changed during an activity evaluation.

Some activities may need multi-level policy evaluation and may include user privacy preferences. For example, a user may be allowed to decide if they want to share data from their car sensors or whether they want to get marketing advertisements. Each activity may evaluate required system and user policies to make a final decision.

Formal Definitions. As shown in Table 1, shown in FIG. 13, sources, clustered objects, objects, and groups may be directly assigned values from the set of atomic values (denoted by Range(att)) for attribute att in set ATT. Each attribute may be a set or atomic value, determined by the attType function and based on its type. Entities may be assigned a single value including null ( ) for an atomic attribute, or multiple values for set-valued attributes from the attribute range. POL may be the set of authorization policies defined in the system which will be defined below.

Clustered objects may be members of different groups, based on preferences and requirements. For example, a car may be assigned to a location group based on its GPS coordinates. In embodiments, it may be assumed that a clustered object may be directly assigned to only one group at the same hierarchy level (specified by the directG function). As described below, since groups inherit attributes from parent groups, assigning a clustered object to one parent group may be sufficient to realize attributes inheritance. Smart cars may have sensors and applications installed in them, which can also be accessed by different sources. Therefore, the parentCO function determines the clustered object to which an object belongs, which is a one to many mapping, that is, an object may only belong to one CO while a CO may have multiple objects. Further, group hierarchy GH (shown as a self-loop on G), may be defined using a partial order relation on G and denoted by $\geq_g$, where $g_1 \geq_g g_2$ signifies $g_1$ is child group of $g_2$ and $g_1$ inherits all the attributes of $g_2$. Function parentG computes the set of parent groups in hierarchy for a child group.

A benefit to introducing groups is the ease of administration, where multiple attributes can be assigned or removed from member clustered objects with a single administrative operation. Group hierarchy may enable attributes inheritance from parent to child groups. Therefore, in the case of set valued attributes, the effective attribute att of a group $g_i$ (denoted by effG$_{att}$ ($g_i$)) is the union of directly assigned values for attribute att and the effective values for att for all its parent groups in group hierarchy. This definition is well formed since $\geq_g$ is a partial order. For a maximal group $g_j$ in this ordering, we have effGatt $g_j$=att($g_j$), giving base cases for this recursive definition. The effective attribute values of clustered object for attribute att (stated as effCO$_{att}$) will then be the directly assigned values for att and the effective attribute values of att for the group to which CO is directly assigned (by directG). Similarly, in addition to direct attributes, sensors in car may inherit attributes from the car itself, such as make, model, location, etc., effO$_{att}$ calculates these effective attributes of objects. For set valued attributes, union operation may be sufficient, which may not be true for atomic attributes. In the case of groups, the most recently updated non-null attribute values in parent groups may overwrite the values of child groups as defined in Table 1. For example, if the most recent value updated in one of the parent groups for Deer_Threat attribute is 'ON', this value may trickle to the child group. It should be noted that overwriting with the most recently updated value in groups is one of the many approaches to inherit atomic attributes, but for the dynamic nature of smart cars ecosystem, this approach may be advantageous. Clustered objects may inherit non-null atomic values from its direct parent group as stated by $effCO_{att}$ (co)=$effG_{att}$ (directG (co)). In the case of objects, parent clustered object will overwrite non-null atomic attributes. For atomic attributes, if the parent(s) have null value for an attribute, the entity (group, clustered object, or object) may retain its directly assigned value without any overwrite.

Authorization functions may be defined for each operation op∈OP, which are policies defined in the system. POL is the set of all authorization functions, $Auth_{op}$ (s: S, ob: CO∪O∪G), which specify the conditions under which source s∈S can execute operation op∈OP on object ob∈CO∪O∪G. Such policies may include privacy preferences set by users for individual clustered objects, objects, and groups or may be system wide by security administrators. The conditions may be specified as propositional logic formula using policy language defined in Table 1. Multiple policies may be satisfied before an activity is allowed to perform. Authorization function, Authorization (a: A, s: S), where an activity a∈A is allowed by source s∈S, specifies the system level, user privacy policies or other relevant policies returning true for an activity to succeed.

CV-$ABAC_G$ is an attribute-based access control model which satisfies fine-grained authorization needs of dynamic, location oriented and time sensitive services and applications in cloud assisted smart cars ecosystem. The model may support personalized privacy controls by utilizing individual user policies and attributes, along with dynamic groups assignment. In embodiments, the model assumes that the information and attributes shared by source and object entities are trusted. For example, the model may assume that location coordinates sent by a car are correct, and may use this shared information to make access and notification decisions.

CV-$ABAC_G$ Enforcement in AWS. In embodiments, the CV-$ABAC_G$ model may be used to enforce a use case of smart cars using, for example, the AWS IoT service. This example may demonstrate how dynamic groups assignment and multi-layer authorization policies in connected vehicle ecosystem may be realized in AWS. Simulations may be used to reflect real connected smart vehicles. In embodiments, no long term vehicle data including real-time GPS coordinates are collected in a central cloud, which mitigates user privacy concerns and encourages wide adoption of the model.

Figure 5:
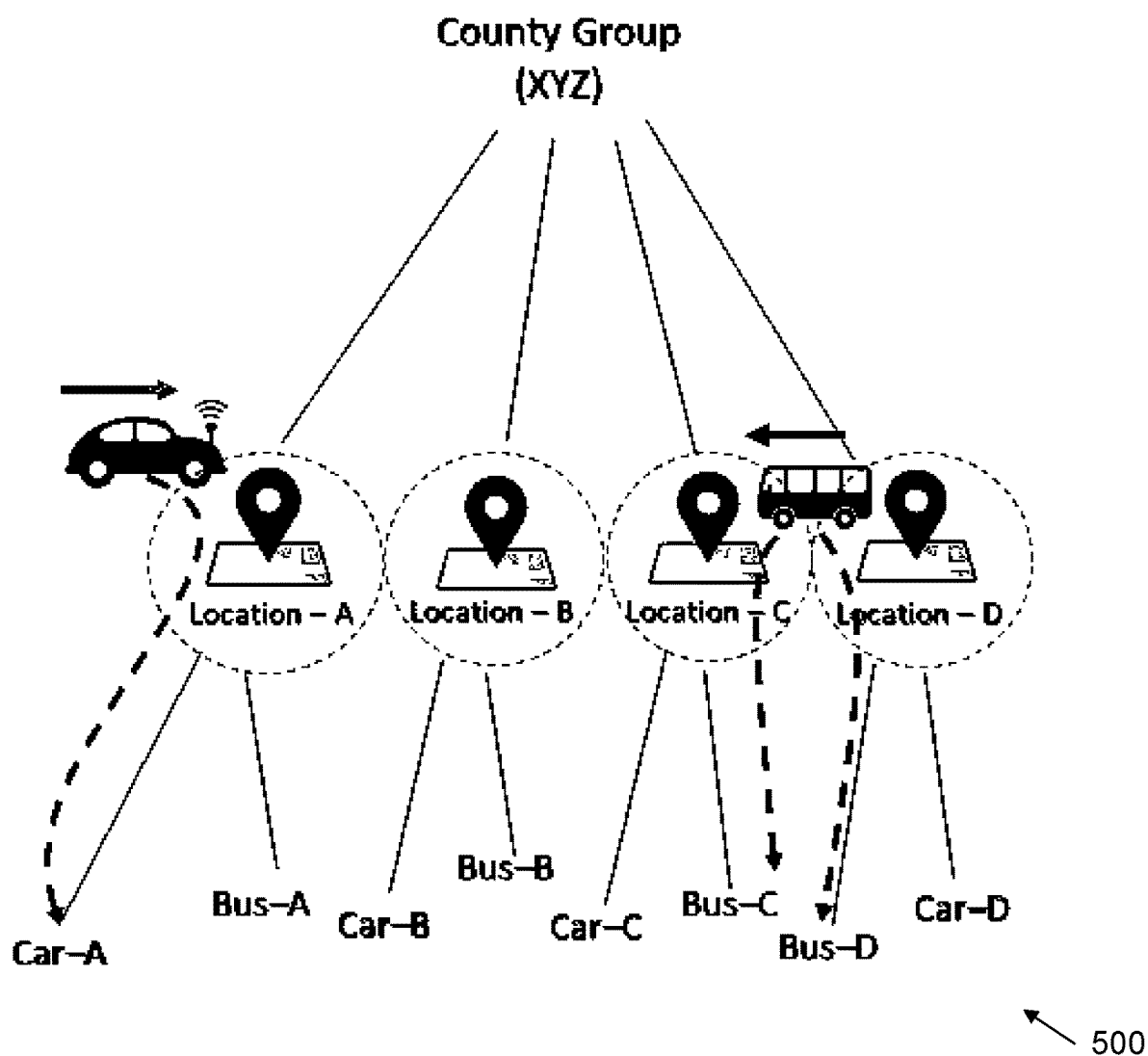
FIG. 5 is an exemplary block diagram of Groups Hierarchy in AWS according to embodiments of the present systems and methods.

Description of Use Cases. Location based alerts and notifications may be used in smart car applications and motivate the use case examples. An example of a defined group hierarchy in AWS is shown in FIG. 5. The implementation may enforce access controls and service notification relevance in use cases such as:

Deer Threat Notification—Smart infrastructure in the city may sense the surrounding environment and notify group(s) regarding the change. In this use case, a motion sensor may sense deer in the area and change Deer_Threat attribute of location group to ON, which in-turn sends alerts to all member vehicles in that location. Similarly, implementation may be done in case of accident notification, speed limit warning, or location based marketing.

Car-Pooling—A traveler needs a ride to Location-A. Using a mobile application, they send car-pooling requests to vehicles in the vicinity that are heading to the destination location requested by the traveler. The request is received by AWS cloud, which computes location and appropriate groups based on the coordinates of the requester, to publish notifications to nearby cars. All the members of the group Car-A, B, C or D can get the request, but some cars may not want to be part of car-pooling, or do not want some requestors to join them because of ratings. User policies may be also checked before a driver is notified of a likely car-pool customer.

Prototype Implementation. In embodiments, an exemplary AWS implementation of the model in these use-case examples may involve two phases: the administrative phase and the operational phase. The administrative phase involves creation of groups hierarchy, dynamic assignment of moving vehicles to different location and sub-groups, attributes inheritance from parent to child groups and to group members, and attributes modification of entities. The operational phase covers how groups are used to scope down the number of vehicles who receive messages or notifications from different sources. Both phases involve multi-layer access control polices. An ABAC policy decision (PDP) and enforcement point (PEP) were created, and an external policy evaluation engine was implemented, which was hooked with AWS to enable attribute-based authorization.

Figure 6:
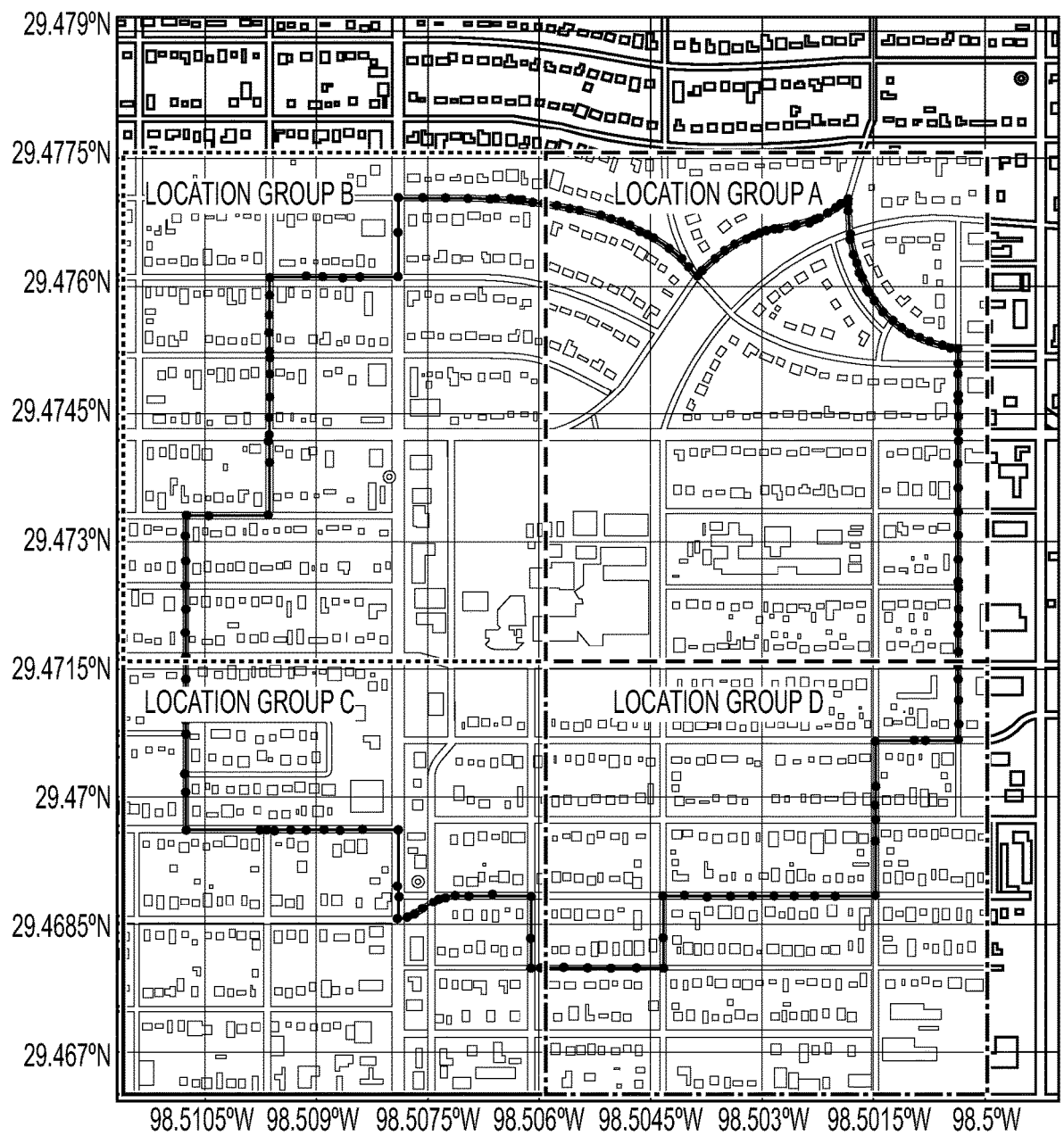
FIG. 6 is an exemplary block diagram of Vehicle GPS Coordinates and Groups Demarcation according to embodiments of the present systems and methods.

Administrative Phase: A group hierarchy was created in AWS as shown in FIG. 5. In this hierarchy, County-XYZ is divided into four disjoint Location-A, B, C and D groups, with each having Car and Bus subgroups for vehicle type car or bus. Ten vehicles were created and their movements were simulated using a python script, which publishes MQTT messages to shadows of these vehicles with current GPS coordinates (generated using Google API) iterated over dots shown in FIG. 6. The area was demarcated into four locations and a moving vehicle belongs to a subgroup in one of these groups. Assuming a current location of Vehicle-1 as Location-D, and it publishes MQTT message with payload: {"state": {"reported": {"Latitude": "29.4769353", "Longitude":"−98.5018237"}}} to AWS topic: $aws/things/Vehicle-1/shadow/update, its new location changes to Location-A and since the vehicle type was defined as car, it is assigned to Car-A group under Location-A as shown by the code snippet shown in FIG. 7. Both attributes, vehicle type and current coordinates of vehicle, may be used to dynamically assign groups, which is important in moving smart vehicles. These functionalities may be implemented as a standalone service (can be enforced as a Lambda service [6] function) using Boto, which is the AWS SDK for Python. Further, in the case of the deer threat notification use-case example, a location-sensor was simulated that senses deer in the area and updates the attribute 'Deer_Threat' of location group to 'ON' or 'OFF'. This is then notified to all members of location and its subgroups. An attribute-based policy was defined to control which sensors can change the 'Deer_Threat' attribute of location groups. As shown in FIG. 8, the policy for Deer_Threat operation checks that a motion sensor with ID='1' and current groups of Location-A can update the attribute Deer_Threat for group Location-A, and if the sensor is relocated to Location-B, it can update the attribute for Location-B group only. This policy ensures that the sensor must be in that location group for which it is updating Deer Threat attribute.

Figure 9:
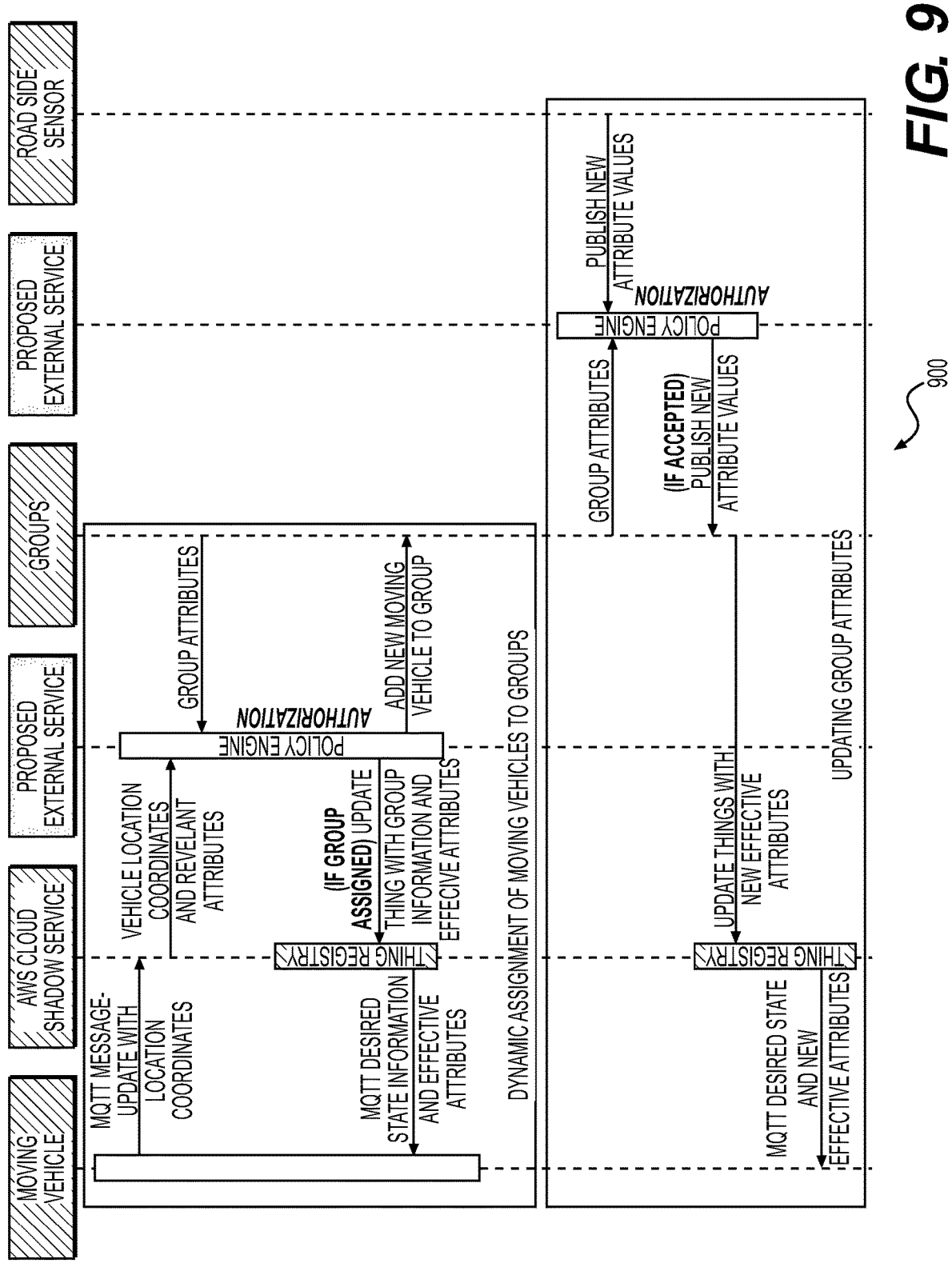
FIG. 9 is an exemplary flow diagram of Dynamic Groups and Attributes Assignment in AWS according to embodiments of the present systems and methods.

The complete sequence of events performed in AWS along with the stand-alone service for the administrative phase is shown in FIG. 9. A moving vehicle updates its coordinates to AWS shadow service, which, along with attributes of vehicles and location groups, determines if the vehicle can be a member of the group using the external enforcement service. If the authorization policy allows a vehicle to be a member of group, the vehicle and group is notified and the vehicle inherits all attributes of its newly assigned group. Similarly, if attribute 'Deer_Threat' of a group is allowed (by the authorization policy) to be changed by the location sensor, the new values are propagated to all its members. Attribute inheritance was implemented from parent to child groups through the service using the update thing_group and the update thing methods. In the use-case example attributes inheritance exists from Location-A to both subgroups Car-A and Bus-A, and to vehicles in Car-A and Bus-A. Therefore, when attribute 'Deer_Threat' is set to ON in group Location-A, its new attributes using Boto describe thing_group command are:
{'Center-Latitude': '29.4745', 'Center-Longitude': '−98.503', 'Deer_Threat': 'ON'}

This inherits the attributes to Car-A child group whose effective attributes will now be: {'Center-Latitude': '29.4745', 'Center-Longitude': '−98.503', 'Deer_Threat': 'ON', 'Location': 'A'}

As shown in FIG. 7, both Vehicle-1 and Vehicle-2 as member of Car-A, the effective attributes of Vehicle-2 are: {'Center-Latitude': '29.4745', 'Center-Longitude': '−98.503', 'Deer_Threat': 'ON', 'Location': 'A', 'Type': 'Car', 'VIN': '9246572903752', 'thingName': 'Vehicle-2'}

Operational Phase: In this phase, attribute-based policies are used to restrict service and notification activities which may require single or multi-level policies along with user preferences. In car-pooling use case, policies were defined to restrict notifications to only a subset of relevant vehicles in specific locations. A requestor in AWS needing a car-pool was simulated. It has attribute 'destination' with value in Location-A, B, C or D. The requestor sends current and destination location as MQTT message to AWS topic $aws/things/Requestor/shadow/update, which, based on these attributes, determines subgroups to which service requests are sent.
{"state": {"reported": {"policy": "car_pool_notification", "source": "Location-A", "destination": "Location-B"}}}

Figure 10:
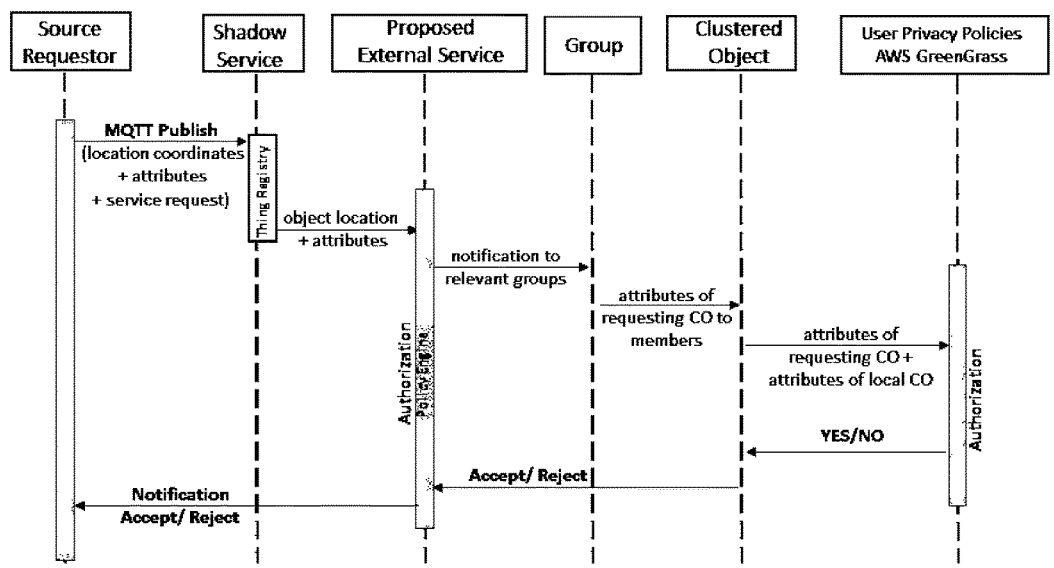
FIG. 10 is an exemplary flow diagram of Diagram for Attributes Based Authorization in AWS according to embodiments of the present systems and methods.

The policy for carpool notification operation (shown in FIG. 8) suggests that if the current location of source requestor is location-A' and the destination location is somewhere in 'Location-A', then all members of sub-group Car-A should be notified. Similarly, if the destination attribute is Location-B, then all members of Car-A, Car-B and Car-C will be notified. In the use-case example, all members of these sub-groups are notified. The policy restricts the number of vehicles which will be requested as compared to all vehicles getting irrelevant notification (as they are far from the requestor or are not vehicle type car) and illustrates the advantages of a location-centric smart car ecosystem. Similarly, location-based marketing may be restricted and policies may be defined to control such notifications. User privacy policies may take effect once the subset of vehicles is calculated. These policies may encapsulate user preferences. For example, in carpooling, a particular driver is not going to the destination requested by the requestor in his request or a driver does not want restaurant advertisements, therefore such notifications will not be displayed on the car dashboard. These local policies may be implemented using AWS Greengrass, which allows running of local lambda functions on the device (in this case a connected vehicle) to enable edge computing facility, an important advantage in real-time smart car applications and to enforce privacy policies. Once accepted by drivers, an AWS Simple Notification Service (SNS) message may be triggered for the requestor from accepting vehicles along with name and vehicle number. The sequence of events for car-pooling activity and multi-layer authorization policies together with user personal preferences is shown in FIG. 10.

An external service to implement ABAC policy decisions and evaluation may provide fine-grained authorization in smart cars ecosystems. The example also demonstrates dynamic groups assignment based on mobile vehicle GPS coordinates and attributes, along with groups based attributes inheritance, which offer administrative benefits in enforcing an ABAC model. In this example, no persistent data from moving vehicles is collected or stored by the central authority hosted cloud, which reaffirms its privacy preserving benefits. Note that the use-case examples described to enforce CV-ABAC$_G$ are not real-time and can bear some latency due to the use of cloud infrastructure. Although CV-ABAC$_G$ enforcement in AWS reflects its use for cloud based applications, similar models may also be implemented in edge (or fog) systems as well to cater to more real-time use-cases.

Figure 11:
FIG. 11 is an exemplary table of Policy Enforcement Time and Scoping according to embodiments of the present systems and methods.
Figure 12:
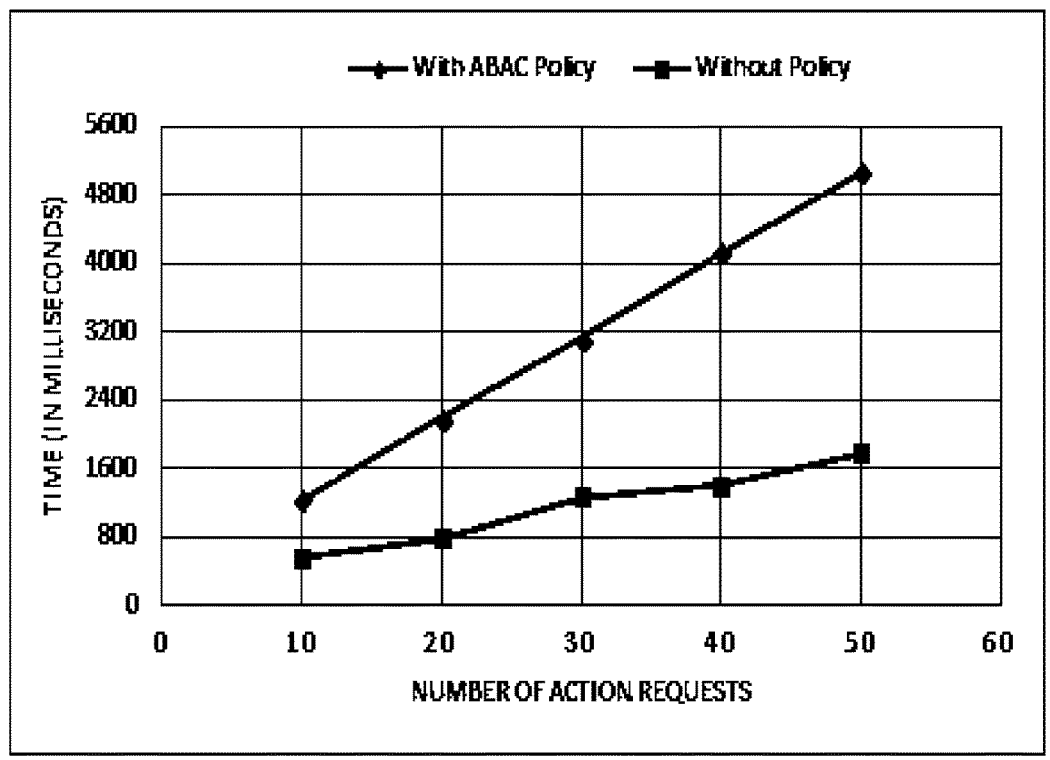
FIG. 12 is an exemplary illustration of Performance Evaluation according to embodiments of the present systems and methods.

Performance Evaluation. The performance of embodiments of the CV-ABAC$_G$ model in AWS was evaluated and different metrics were provided when no policies were used against the implemented ABAC policies for the car-pooling notification use-case example. As shown in FIG. 11, the external policy evaluation engine has average time (in milliseconds) to decide on car-pooling service requests and provide the subset of cars which are notified. This scoping ensures the service relevance, as without a policy, all 5 vehicles were sent car-pool requests (even when one was 20 miles away from the requestor), whereas with attribute based policies, only nearby cars are notified. The performance graph shown in FIG. 12 compares no policy execution time (bottom line) against implemented ABAC policy (top line). Since, in the experiments, the policy (shown in FIG. 8) evaluated for each access request was the same, a linear graph results, as the number of access requests increase the number of times the policy is evaluated and so its total evaluation time. Some variation in the bottom line occurs because of the network latency time to access the AWS cloud, although this can change based on the communication technologies used by vehicles including 3G, LTE, cellular or dedicated short-range communications (DSRC). The external policy engine does have some impact on the performance against no policy when used with a number of vehicles. However, when used in city wide scenario, this time will be overshadowed by the notification time to all vehicles against a subset of vehicles provided by the policy evaluation engine. The model and the use-case example is focused to ensure service relevance to moving drivers on road which is well achieved even with a little tradeoff.

Embodiments may provide a fine-grained attribute-based access control model for time-sensitive and location-centric smart cars ecosystem. The model may provide dynamic groups in relation to connected vehicles and may emphasize the relevance in this context. Besides considering system wide authorization policies, the model may also support personal preference policies for different users, which is advantageous in today's privacy conscious world. Several real world use-case examples and a proof of concept implementation of the CV-ABAC$_G$ model demonstrates how moving vehicles may be dynamically assigned to location and sub-groups defined in the system based on the current GPS coordinates, vehicle-type, and other attributes, besides the use of attribute based security policies in distributed and mobile connected cars ecosystem. Further, location privacy preserving approaches such as homomorphic encryption and other anonymity techniques may be used to complement and extend the model which can mitigate location sharing concerns without affecting its advantages and application.

Figure 14:
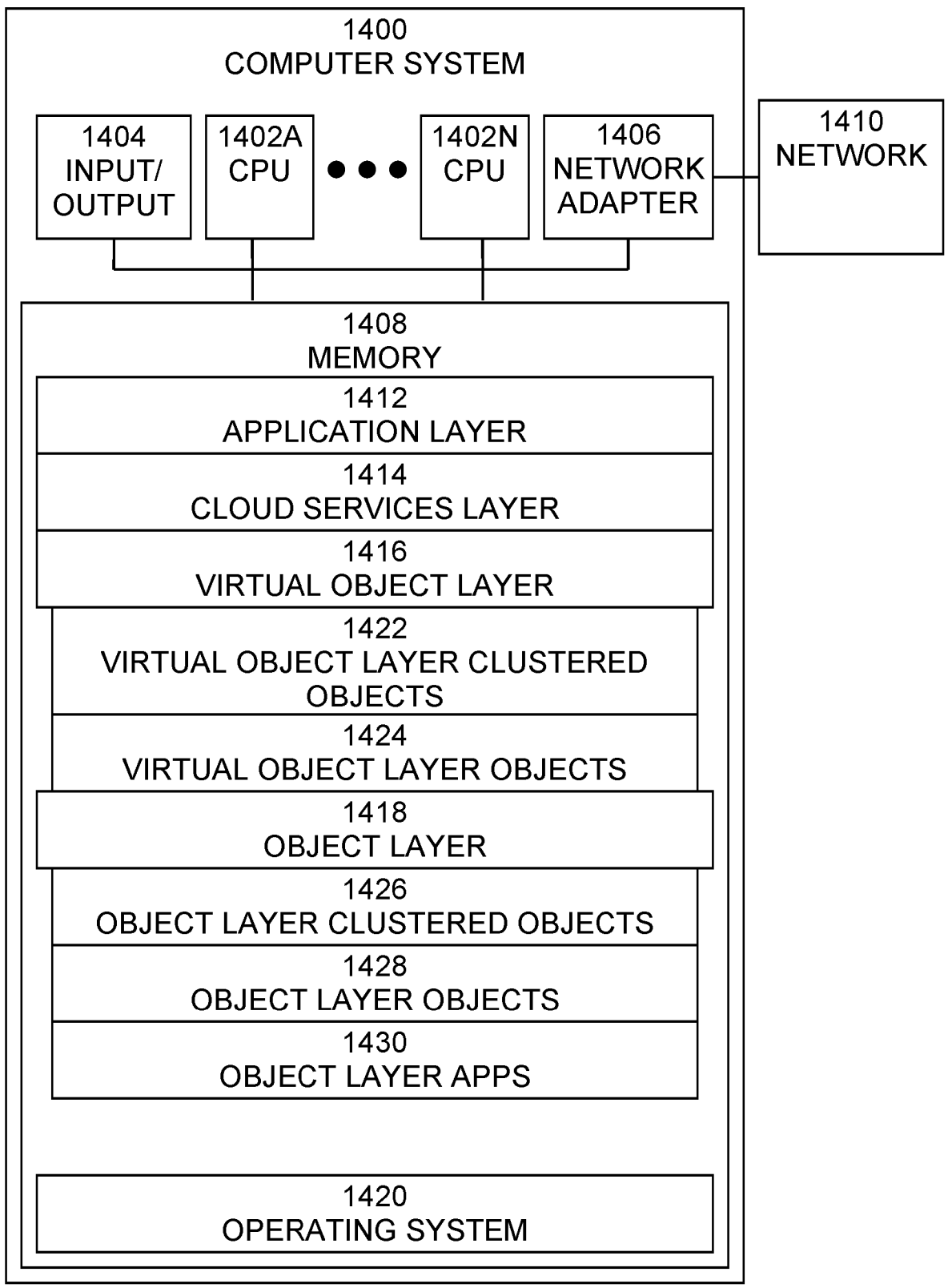
FIG. 14 is an exemplary block diagram of a computer system, in which processes involved in the embodiments described herein may be implemented.

An exemplary block diagram of a computer system 1400, in which processes involved in the embodiments described herein may be implemented, is shown in FIG. 14. Computer system 1400 may be implemented using one or more programmed general-purpose computer systems, such as embedded processors, systems on a chip, personal computers, workstations, server systems, and minicomputers or mainframe computers, or in distributed, networked computing environments. Computer system 1400 may include one or more processors (CPUs) 1402A-1402N, input/output circuitry 1404, network adapter 1406, and memory 1408. CPUs 1402A-1402N execute program instructions in order to carry out the functions of the present communications systems and methods. Typically, CPUs 1402A-1402N are one or more microprocessors, such as an INTEL CORE® processor. FIG. 14 illustrates an embodiment in which computer system 1400 is implemented as a single multi-processor computer system, in which multiple processors 1402A-1402N share system resources, such as memory 1408, input/output circuitry 1404, and network adapter 1406. However, the present communications systems and methods also include embodiments in which computer system 1400 is implemented as a plurality of networked computer systems, which may be single-processor computer systems, multi-processor computer systems, or a mix thereof.

Input/output circuitry 1404 provides the capability to input data to, or output data from, computer system 1400. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 1406 interfaces device 1400 with a network 1410. Network 1410 may be any public or proprietary LAN or WAN, including, but not limited to the Internet.

Memory 1408 stores program instructions that are executed by, and data that are used and processed by, CPU 1402 to perform the functions of computer system 1400. Memory 1408 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 1408 may vary depending upon the function that computer system 1400 is programmed to perform. In the example shown in FIG. 14, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In embodiments, at least a portion of the software shown in FIG. 14 may be implemented on a current leader server. Likewise, in embodiments, at least a portion of the software shown in FIG. 14 may be implemented on a computer system other than the current leader server.

In the example shown in FIG. 14, memory 1408 may include application layer 1412, cloud services layer 1414, virtual object layer 1416, object layer 1418, and operating system 1420. Application layer 1412 may include software routines and data to provide application services, as described above. Cloud services layer 1414 may include software routines and data to provide cloud services, as described above. Virtual object layer 1416 may include software routines and data to provide virtual object services to act as an intermediate between cloud services and the physical layer, which offers abstraction by creating cyber entities for physical objects in object layer 1418, as described above. Virtual object layer 1416 may include clustered objects 1422 and objects 1424. Clustered objects 1422 may include software routines and data to provide operation and applications of objects with multiple individual sensors in virtual object layer 1416, as described above. Objects 1424 may include software routines and data to provide operation and applications of objects in virtual object layer 1416, as described above. Object layer 1418 may include software routines and data to provide object services to represent physical clustered objects and sensors along with applications installed on them. Object layer 1418 may include clustered objects 1426, objects 1428, and apps 1430. Clustered objects 1426 may include software routines and data to provide operation of objects 1428 with multiple individual sensors in object layer 1418, as described above. Objects 1428 may include software routines and data to provide operation devices, such as sensors, in object layer 1418, as described above. Apps 1430 may include software routines and data to provide applications of objects 1428 and clustered objects 1426 in object layer 1418. Operating system 1434 may provide overall system functionality.

As shown in FIG. 14, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A cloud-implemented method for providing access control to a plurality of vehicles, implemented in a cloud computing system comprising a plurality of networked computer systems, each networked computer system comprising a processor, memory accessible by the processor, and computer program instructions stored in the memory and executable by the processor, the method comprising:
   generating, at the cloud computing system, stored data representing a plurality of vehicles, each vehicle of the plurality of vehicles having a plurality of sensors, wherein each vehicle transmits notifications to and receives notifications from the cloud computing system via a communication network;
   detecting, at the plurality of sensors associated with each vehicle of the plurality of vehicles, a location and at least one direct attribute for each vehicle of the plurality of vehicles;
   receiving, at the cloud computing system, a driver preference for a selected vehicle of the plurality of vehicles;
   assigning, at the cloud computing system, the selected vehicle of the plurality of vehicles to at least one group and to at least one sub-group based on the location, the driver preference, and the at least one direct attribute;
   assigning, at the cloud computing system, a set of effective attributes for each vehicle of plurality of vehicles,
      wherein the set of effective attributes comprises the location, the direct attribute, and the driver preference associated with the selected vehicle of the plurality of vehicles, and further comprises additional attributes based on a selected group and on a selected sub-group, and
      wherein values of selected additional attributes from the selected sub-group are inherited from values of selected additional attributes from the selected group only if the values of the selected additional attributes from the selected group have been updated more recently than the values of the selected additional attributes from the selected sub-group;
   generating, at the cloud computing system, a policy related to the selected sub-group of the selected group;
   receiving, at the cloud computing system, a selected notification to the selected sub-group of the selected group;
   evaluating, at the cloud computing system, whether the selected notification is in compliance with the determined policy based on the set of effective attributes for the selected vehicle; and
      if the selected notification is in compliance with the policy and with the driver preference, wirelessly transmitting the selected notification to the selected vehicle; and
      if the selected notification is not in compliance with the policy and with the driver preference, not transmitting the selected notification;
   evaluating, at the vehicle, whether the selected notification is in compliance with the determined policy based on the set of effective attributes for the selected vehicle; and
      if the selected notification is in compliance with the policy, transmitting the selected notification to the user; and
      if the selected notification is not in compliance with the policy, not transmitting the selected notification to the user.

2. The method of claim 1, wherein the sensors associated with the plurality of vehicles are attached to the vehicles or are integrated with the vehicles.

3. The method of claim 2, wherein the sensors associated with the plurality of vehicles detect conditions of the vehicles or operations of the vehicles initiated by occupants of the vehicles.

4. The method of claim 1, wherein the sensors that are not associated with the plurality of vehicles detect conditions of locations external to the vehicles.

5. The method of claim 1, wherein the at least one direct attribute of a vehicle of the plurality of vehicles includes at least one of a vehicle type, a vehicle speed, an air temperature outside the vehicle, a vehicle make, a vehicle model, or a vehicle year.

6. A system for providing access control to a plurality of vehicles, comprising:
   a cloud computing system comprising a plurality of networked computer systems, each networked computer system comprising a processor, memory accessible by the processor, and computer program instructions stored in the memory and executable by the processor, to execute a method comprising:
      generating, at the cloud computing system, stored data representing a plurality of vehicles each vehicle of the plurality of vehicles having a plurality of sensors, wherein each vehicle transmits notifications to and receives notifications from the cloud computing system via a communication network;
      detecting, at the plurality of sensors associated with the plurality of vehicles, a location and at least one direct attribute for each vehicle of the plurality of vehicles;
      receiving, at the cloud computing system, a driver preference for a selected vehicle of the plurality of vehicles;
      assigning, at the cloud computing system, the selected vehicle of the plurality of vehicles to at least one group and to at least one sub-group based on the location, the driver preference, and the at least one direct attribute;
      assigning, at the cloud computing system, a set of effective attributes for each vehicle of plurality of vehicles,
         wherein the set of effective attributes comprises the location, the direct attribute, and the driver preference associated with the selected vehicle of the plurality of vehicles, and further comprises additional attributes based on a selected group and on a selected sub-group, and
         wherein values of selected additional attributes from the selected sub-group are inherited from values of selected additional attributes from the selected group only if the values of the selected additional attributes from the selected group have been updated more recently than the values of the selected additional attributes from the selected sub-group;
      generating, at the cloud computing system, a policy related to the selected sub-group of the selected group;
      receiving, at the cloud computing system, a selected notification to the selected sub-group of the selected group;

evaluating, at the cloud computing system, whether the selected notification is in compliance with the determined policy based on the set of effective attributes for the selected vehicle; and
    if the selected notification is in compliance with the policy and with the driver preference, wirelessly transmitting the selected notification to the selected vehicle; and
    if the selected notification is not in compliance with the policy and with the driver preference, not transmitting the selected notification;
evaluating, at the vehicle, whether the selected notification is in compliance with the determined policy based on the set of effective attributes for the selected vehicle; and
    if the selected notification is in compliance with the policy, transmitting the selected notification to the user; and
        if the selected notification is not in compliance with the policy, not transmitting the selected notification to the user.

7. The system of claim 6, wherein the sensors associated with the plurality of vehicles are attached to the vehicles or are integrated with the vehicles.

8. The system of claim 7, wherein the sensors associated with the plurality of vehicles detect conditions of the vehicles or operations of the vehicles initiated by occupants of the vehicles.

9. The system of claim 6, wherein the sensors that are not associated with the plurality of vehicles detect conditions of locations external to the vehicles.

10. The system of claim 6, wherein the at least one direct attribute of a vehicle of the plurality of vehicles includes at least one of a vehicle type, a vehicle speed, an air temperature outside the vehicle, a vehicle make, a vehicle model, or a vehicle year.

11. A computer program product for providing access control to a plurality of vehicles, the computer program product comprising a non-transitory computer readable storage having program instructions embodied therewith, the program instructions executable by at least one computer system in a cloud computing system comprising a plurality of networked computer systems, each networked computer system comprising a processor, memory accessible by the processor, and the computer program instructions stored in the memory and executable by the processor, to execute a method comprising:
generating, at the cloud computing system, stored data representing a plurality of vehicles, each vehicle of the plurality of vehicles having a plurality of sensors, wherein each vehicle transmits notifications to and receives notifications from the cloud computing system via a communication network;
detecting, at the plurality of sensors associated with each vehicle of the plurality of vehicles, a location and at least one direct attribute for each vehicle of the plurality of vehicles;
receiving, at the cloud computing system, a driver preference for a selected vehicle of the plurality of vehicles;
assigning, at the cloud computing system, the selected vehicle of the plurality of vehicles to at least one group and to at least one sub-group based on the location, the driver preference, and the at least one direct attribute;
assigning, at the cloud computing system, a set of effective attributes for each vehicle of plurality of vehicles, wherein the set of effective attributes comprises the location, the direct attribute, and the driver preference associated with the selected vehicle of the plurality of vehicles and further comprises additional attributes based on a selected group and on a selected sub-group, and
wherein values of selected additional attributes from the selected sub-group are inherited from values of selected additional attributes from the selected group only if the values of the selected additional attributes from the selected group have been updated more recently than the values of the selected additional attributes from the selected sub-group;
generating, at the cloud computing system, a policy related to the selected sub-group of the selected group;
receiving, at the cloud computing system, a selected notification to the selected sub-group of the selected group;
evaluating, at the cloud computing system, whether the selected notification is in compliance with the determined policy based on the set of effective attributes for the selected vehicle; and
    if the selected notification is in compliance with the policy and with the driver preference, wirelessly transmitting the selected notification to the selected vehicle; and
    if the selected notification is not in compliance with the policy and with the driver preference, not transmitting the selected notification;
evaluating, at the vehicle, whether the selected notification is in compliance with the determined policy based on the set of effective attributes for the selected vehicle; and
    if the selected notification is in compliance with the policy, transmitting the selected notification to the user, and
    if the selected notification is not in compliance with the policy, not transmitting the selected notification to the user.

12. The computer program product of claim 11, wherein the sensors associated with the plurality of vehicles are attached to the vehicles or are integrated with the vehicles.

13. The computer program product of claim 12, wherein the sensors associated with the plurality of vehicles detect conditions of the vehicles or operations of the vehicles initiated by occupants of the vehicles.

14. The computer program product of claim 11, wherein the sensors that are not associated with the plurality of vehicles detect conditions of locations external to the vehicles.

15. The computer program product of claim 11, wherein the at least one direct attribute of a vehicle of the plurality of vehicles includes at least one of a vehicle type, a vehicle speed, an air temperature outside the vehicle, a vehicle make, a vehicle model, or a vehicle year.

16. A system comprising:
a server;
a plurality of vehicles, wherein each vehicle transmits messages to and receives messages from the server via a communication network, and wherein each vehicle comprises at least an electronic computing device for receiving and sending messages;
a plurality of sensors associated with each vehicle of the plurality of vehicles, wherein at least some of the plurality of sensors are located on or within each vehicle of the plurality of vehicles, and wherein the plurality of sensors is in communication with the electronic computing device associated with each vehicle of the plurality of vehicles;

the server and the plurality of vehicles configured to perform a method comprising:

determining, at a selected vehicle of the plurality of vehicles, a location and a direct attribute of the selected vehicle based on at least one sensor of the plurality of sensors associated with the selected vehicle;

transmitting the direct attribute and the location of the selected vehicle to the server via the communication network;

receiving, at the server, a driver preference for the selected vehicle of the plurality of vehicles;

assigning, at the server, the selected vehicle of the plurality of vehicles to a selected group of a plurality of groups and to a selected sub-group of the selected group based on the direct attribute, the location, and the driver preference of the selected vehicle of the plurality of vehicles;

assigning, at the server, a set of effective attributes for each vehicle of the plurality of vehicles, wherein the set of effective attributes comprises the location, the direct attribute, and the driver preference associated with the selected vehicle of the plurality of vehicles, and further comprises additional attributes based on the selected group and on the selected sub-group, and wherein values of selected additional attributes from the selected sub-group are inherited from values of selected additional attributes from the selected group only if the values of the selected additional attributes from the selected group have been updated more recently than the values of the selected additional attributes from the selected sub-group;

determining, at the server, a policy for the selected sub-group of the selected group;

receiving, at the server, a selected message to the selected sub-group of the selected group;

evaluating, at the server, whether the selected message is in compliance with the determined policy based on the set of effective attributes for the selected vehicle; and if the selected message is in compliance with the policy and with the driver preference, wirelessly transmitting the selected message to the selected vehicle; and if the selected message is not in compliance with the policy or not in compliance with the driver preference, not transmitting the selected message;

evaluating, at the vehicle, whether the selected message is in compliance with the determined policy based on the set of effective attributes for the selected vehicle; and if the selected message is in compliance with the policy, transmitting the selected message to the user; and if the selected message is not in compliance with the policy, not transmitting the selected message to the user.

17. The system of claim 16, wherein the direct attribute of the selected vehicle of the plurality of vehicles comprises at least one of a vehicle speed, a vehicle type, an air temperature outside the vehicle, a vehicle make, a vehicle model, or a vehicle year.

18. The system of claim 16, wherein an identity of the selected vehicle of the plurality of vehicles is anonymized prior to being shared with the server.

19. The system of claim 18, wherein homomorphic encryption is used to anonymize the identity of the selected vehicle of the plurality of vehicles prior to the anonymized identity being shared with the server.

20. The system of claim 1, wherein evaluating whether the selected notification is in compliance with the policy takes place in under 0.5 msec.

21. The system of claim 6, wherein evaluating whether the selected notification is in compliance with the policy takes place in under 0.5 msec.

22. The system of claim 11, wherein evaluating whether the selected notification is in compliance with the policy takes place in under 0.5 msec.

23. The system of claim 16, wherein the evaluation whether the selected message is in compliance with the policy takes place in under 0.5 msec.

* * * * *